No. 735,145. Patented August 4, 1903.

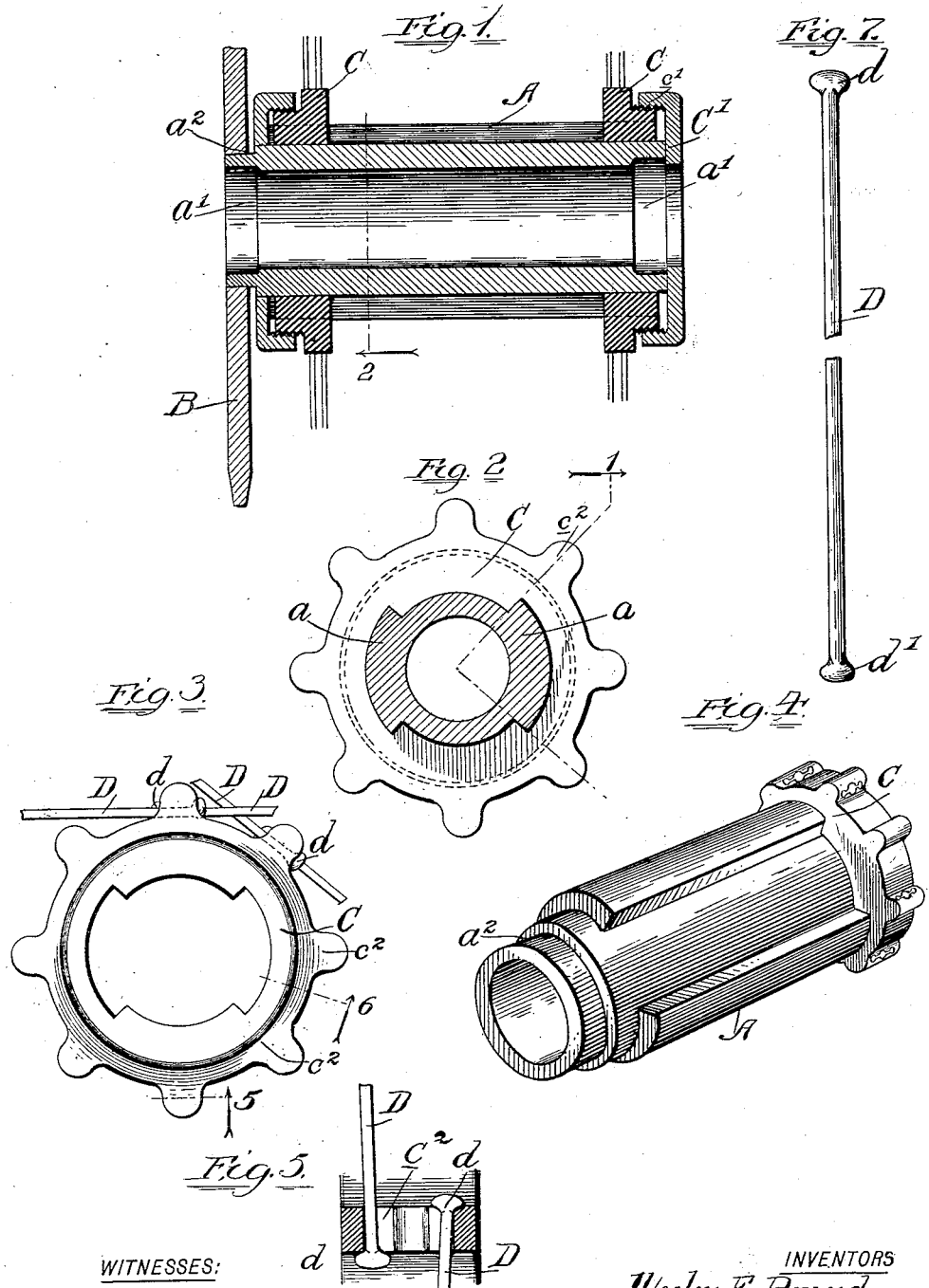

UNITED STATES PATENT OFFICE.

WESLEY E. POUND, EDWARD A. POUND, AND ARNOLD R. POUND, OF DIXON, ILLINOIS.

VEHICLE-HUB.

SPECIFICATION forming part of Letters Patent No. 735,145, dated August 4, 1903.

Application filed February 19, 1902. Serial No. 94,836. (No model.)

*To all whom it may concern:*

Be it known that we, WESLEY E. POUND, EDWARD A. POUND, and ARNOLD R. POUND, citizens of the United States, and residents of Dixon, in the county of Lee and State of Illinois, have invented certain new and useful Improvements in Vehicle-Hubs; and we do hereby declare that the following is a full, clear, and exact description thereof, reference being had to the accompanying drawings, and to the letters of reference marked thereon, which form a part of this specification.

This invention relates to improvements in "vehicle-hubs," and more particularly for a hub for vehicle-wheels with which wire spokes are used.

The object of the invention is to provide a cheap, strong, and durable construction whereby a desired and uniform tension may be secured on the spokes, thereby at all times holding the wheel-rim exactly centered with respect to the hub.

The invention consists in the matters hereinafter described, and more fully pointed out and defined in the appended claims.

In the drawings, Figure 1 is a longitudinal vertical section of a hub embodying our invention, the same being, as shown, the rear hub of a bicycle or other vehicle and having a sprocket-wheel thereon. Fig. 2 is a section taken on line 2 2 of Fig. 1. Fig. 3 is a side elevation of one of the spoke-collars, showing the same removed from the hub. Fig. 4 is a perspective view of a hub embodying our invention. Fig. 5 is a section taken on line 5 5 of Fig. 3. Fig. 6 is a section taken on line 6 6 of Fig. 3. Fig. 7 is a fragmentary view of one of the spokes.

As shown in said drawings, A indicates the tubular sleeve of the hub, which, as shown in Figs. 2 and 4, is provided for its entire length with a longitudinal groove on opposite sides thereof and providing lateral shoulders on each side of each groove. The bore of said sleeve is slightly enlarged at each end, as indicated at $a'$, to enable the usual members of a ball-bearing to be secured therein. The sprocket end of said hub-sleeve is provided with a seat adapted to receive the sprocket or other driving mechanism B. As shown, said end is turned down to provide a seat for the sprocket and an outwardly-facing shoulder, (indicated by $a^2$,) against which abuts the inner side of the sprocket. Fitting on said sleeve A and provided with a central aperture complemental with the cross-sectional contour of the sleeve are the spoke-collars C, which may be of any desired material and which are adapted to slide inwardly to the center of the sleeve, but are held from rotation thereon by the configuration of said sleeve, which fits closely in the aperture in the collar. Each of said collars is provided on its outer side with an integral screw-threaded part of less diameter, adapted to be engaged by the internally-screw-threaded flange $c'$ of the disks C', which are apertured, as shown in Fig. 1, to permit the crank-axle to pass therethrough and which abut on their inner sides with the ends of the sleeves.

Each of the collars C is provided, as shown in Fig. 2, with radial projections arranged equal distances apart, each of which is adapted to afford attachment for two of the spokes, (indicated by D.) Said projections, as shown, are each provided with a slotted aperture extending therethrough at a tangent with the periphery of the collar, as shown in Figs. 4, 5, and 6. Said apertures are elongated longitudinally of the projections and are enlarged centrally to permit passage therethrough of the smaller head $d$ of the spoke D and are enlarged at each end to a size slightly larger than the diameter of the spokes to permit a part of the head of the same to be drawn into positive engagement therein, as shown in Fig. 5. The outer or rim ends of the spokes D are provided with heads $d'$ slightly larger than the head $d$ and which engage in the apertures in the wheel-rim, which are made sufficiently large to permit the head $d$ to pass therethrough.

The operation is as follows: With the spoke-collars moved inwardly to the middle of the sleeve the smaller head of the spoke is passed through the aperture of the rim and through the central enlargement of the aperture or slot in the projection $c^2$ and is then pushed laterally into the end of the slot, where the head engages in the slight enlargement before described. A similar spoke is passed through the rim in the opposite direction and through the projection $c^2$ from the opposite direction, as shown in Fig. 3, and pushed to the opposite end of said slot. In a like manner the entire number of spokes required for a wheel are first passed through the rim, so that the larger head engages on the inner side of the same, and the inner end of the spoke is secured in the aperture in the appropriate projecture $c^2$ of the spoke-collar. When all the spokes forming the wheel have been secured in position in the spoke-collars, the same are forced oppositely and outwardly toward the ends of the hub-sleeve A and the disks C' engaged with the screw-threaded portions $c$ on said spoke-collars and turned up, thus drawing such spoke-collars outwardly to the ends of the hub until a desired tension is secured. Inasmuch as all of the spokes are of the same length and the apertures in the rim and in the projections $c^2$ are of equal size, it follows that the rim must be exactly on the hub.

Obviously any desired means may be employed for holding the spoke-collars in position and from rotation on the hub. It is also evident that hubs constructed as described may be made of any desired size and sufficiently strong for any desired purpose.

Obviously many details of construction may be varied without departing from the principles of this invention.

We claim as our invention—

1. In a vehicle-hub, the combination with a hub-sleeve, having sides parallel with its axis, of longitudinally-slidable collars thereon adapted to afford attachment for the spokes, means acting to hold said collars from rotation on the sleeve and means engaging against the ends of said sleeve, adapted to move said collars oppositely and outwardly to the ends of said sleeve, thereby bringing tension on the spokes.

2. The combination with a vehicle-hub, of spoke-collars longitudinally slidable of the hub-axis, projections thereon adapted to be engaged by the inner end of the spokes when centrally located on the hub, and flanged disks adapted to engage the ends of the sleeve and force said spoke-collars oppositely and toward the extremities of the hub, and firmly and rigidly securing the same from inward movement, thereby bringing tension on the spokes.

3. In a vehicle-wheel, the combination with the apertured rim of a hub-sleeve, non-rotative spoke-collars longitudinally slidable thereon, radial projections on said spoke-collars apertured to receive the inner end of said spokes when said spoke-collars are located centrally of the sleeve, and flanged disks adapted to have threaded engagement with said spoke-collars and force them to the extremities of the sleeve and rigidly securing them in such position.

4. The combination with a longitudinally-grooved sleeve, of spoke-collars longitudinally movable thereon, parts on the spoke-collars engaging in said grooves and acting to hold the same from rotation with respect to the sleeve, apertures in said spoke-collars adapted to receive the inner ends of oppositely-directed spokes and members bearing against the ends of the sleeve and adapted to positively engage and lock the spoke-collars in a position to bring tension on the spokes.

5. A hub-sleeve for the purpose specified comprising a one-piece tubular sleeve of metal or the like, provided with oppositely-disposed longitudinal grooves and recessed in the ends to receive the members of a ball-bearing and an outwardly-directed shoulder on one end of said sleeve.

6. A spoke-collar for the purpose specified comprising a circular collar apertured centrally and provided on opposite sides with inwardly-directed projections adapted to engage in a complemental groove in a hub, radial projections on said collar apertured tangentially with the collar, said apertures being elongated parallel with the axis of the collar and adapted to permit the engagement therein of oppositely-directed spokes.

7. A spoke-collar for the purpose specified comprising a circular collar provided on one side with screw-threads, means for holding the same from rotation on a hub-sleeve, radial projections on the collar, apertures extending therethrough approximately at a tangent therewith, said apertures being elongated parallel with the axis of the collar and enlarged centrally and at the ends thereof to permit the passage of a spoke-head therethrough and its engagement therein.

8. The combination in a wheel-hub, of a longitudinally-slotted sleeve, spoke-collars adapted to slide longitudinally on the sleeve, projections on said collars adapted to engage in said slots or grooves, screw-threads on the outer side of said collars, radial projections on the collar having apertures extending therethrough at approximately a tangent with the collar and so formed as to permit the passage of the spoke-head therethrough and the engagement therein, and a rotative member carried on the end of the sleeve and provided with a screw-threaded flange adapted to engage the screw-threaded part of the spoke-collar and acting to draw said collar outwardly on the sleeve.

9. In a device of the class described the combination with a hub-sleeve having longitudinal parallel ridges thereon, of centrally-apertured spoke-collars slidable on said sleeve and held from rotation thereon by said ridges, a plurality of radial projections larger at the center than at either end and metal spokes provided at their opposite ends with a rounded head, that at one end being materially smaller than at the other and adapted to closely engage in one end of said slot.

In witness whereof we have hereunto subscribed our names in the presence of two subscribing witnesses.

WESLEY E. POUND.
   EDWARD A. POUND.
   ARNOLD R. POUND.

Witnesses:
 WM. L. LEECH,
 M. M. AVERY.